3,318,533
EXHAUST PIPE EXTENSION CONTAINING SPHERICAL, RUBBER ROLLER
Kirk Besoyan, Hollywood, Calif., assignor of one-third to Elwood L. Hancel, Los Angeles, Calif., and one-third to David G. Schwartz, Los Angeles, Calif.
Filed Nov. 16, 1964, Ser. No. 411,335
4 Claims. (Cl. 239—288.5)

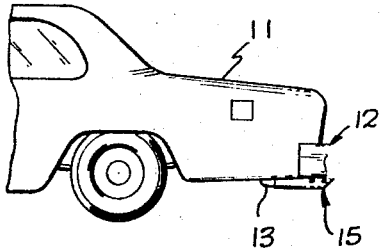
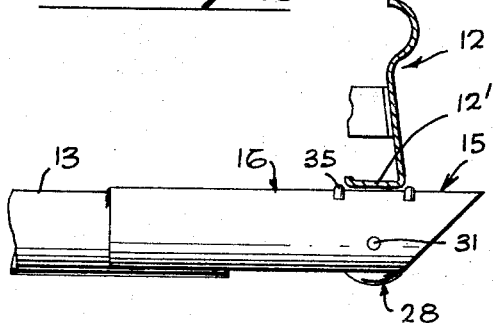
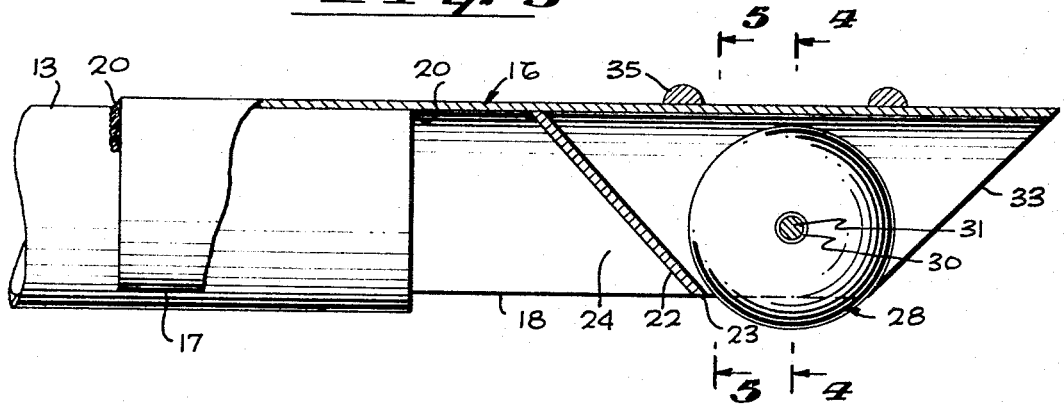
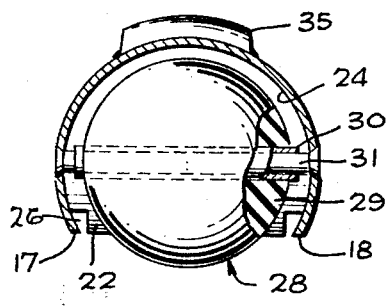
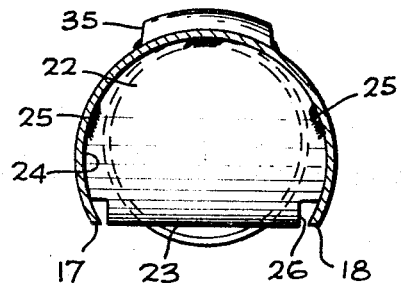
KIRK BESOYAN
INVENTOR.
BY
ATTORNEYS United States Patent Office 3,318,533
Patented May 9, 1967

This invention has to do with extensions or tips used on the ends of the tailpipes of automobile exhaust systems for the purpose of carrying the exhaust gases beyond and below the bumper and thereby protecting the same from the discoloration and corrosive action of the gases and also used to enhance the appearance of the automobile.

An object of the invention is to provide an improved exhaust pipe extension of novel construction and appearance.

A particular object of the invention is to provide a novel exhaust pipe extension, which, in addition to its usual function, serves to provide anti-friction means between the bumper of an automobile and the ground to prevent the bumper and other parts from scraping on the roadway when the automobile traverses abrupt changes in the grade of the roadway, as when entering and leaving steeply inclined driveways and when passing through sharp dips or depressions in the roadway.

Another object is to provide a device of the type indicated embodying a roller adapted to engage the roadway and quietly rollingly support the back end of a vehicle under conditions where the vehicle would otherwise scrape the roadway and to provide means for deflecting the exhaust gases away from the roller to prevent overheating and corrosion and other deterioration of the roller and the outer end portion of the device.

Another object is to provide a device in the nature of an extension for a tailpipe which is easily and quickly mountable on the conventional tailpipe of an automobile. In this connection it is an object to provide a device which is designed to be mounted on various-sized tailpipes.

A further object is to provide a device of the type indicated having means adapted to seat and engage the lower edge portion of the automobile bumper under conditions when the device engages the ground to prevent longitudinal stresses induced in the device by such engagement with the ground from being transmitted to the various components of the exhaust system by transferring such stresses to the bumper of the automobile.

Still another object is to provide a device which is also useful on other vehicles apart from the exhaust system, as on the back ends of trailers and the like, to act as a wheeled support therefor in situations where the back end might otherwise scrape upon the roadway, and to simulate the appearance of an exhaust pipe.

A further object is to provide a device of the type indicated which prevents the squashing or deformation of the end as occurs in conventional exhaust pipe extensions, and one which is not susceptible to becoming plugged with dirt as when the automobile is backed into a dirt bank.

These and other objects will be apparent from the drawing and the following description. Referring to the drawing:

FIG. 1 is a fragmentary side elevational view of the rear portion of an automobile showing a device embodying the invention installed thereon;

FIG. 2 is a side elevational view of the device and portions of the tailpipe and bumper of the automobile, the latter being in section, the view being on a larger scale than FIG. 1;

FIG. 3 is a longitudinal sectional view through the device, but on a still larger scale;

FIG. 4 is a cross sectional view on line 4—4 of FIG. 3; and

FIG. 5 is a cross sectional view on line 5—5 of FIG. 3.

More particularly describing the invention, numeral 11 generally designates an automobile which is shown as having a conventional type of bumper 12 and a rearwardly projecting tailpipe 13 which is the rearmost portion of the exhaust system of the automobile. The device of the invention is designated generally by numeral 15 and this comprises what will be termed a generally tubular or semitubular body 16. The body is preferably generally cylindrical in cross section, although other tubular shapes may be used. The body is interrupted from end to end by a relatively wide opening or slot extending longitudinally thereof and defined by the edges 17 and 18 so that the body is not tubular within a strict definition of the word but may be described as generally tubular or semitubular.

While the body may be of any desired diameter, I prefer to make the device of a size such that it will receive the largest standard-sized tailpipe and thus in the drawings the diameter of the body is somewhat greater than the diameter of the tailpipe. The body is preferably rigidly attached to the end portion of the tailpipe 13 by welds 20. However, other means might be used, such as setscrews mounted in the body.

Between its ends the body is provided with a partition or gas deflector wall 22 which is inclined so that its lower edge 23 is closest to the outer end of the body. The wall 22 closely fits the interior surface 24 of the body, being spot-welded at 25, except at the very bottom thereof where it is relieved or cut away at each side at 26. The straight lower edge 23 is in the same plane as the edges 17 and 18 defining the opening or slot in the body. The wall 22 serves to deflect the exhaust gases issuing from the end of the tailpipe downwardly.

The body is fitted with a roller 28 adjacent its outer end. The roller is preferably formed of a relatively hard (90 shore) body 29 of synthetic rubber or other suitable material of sufficient strength and which is quiet in operation, mounted on a relatively noncorrosive metal bushing 30, the ends of which should extend beyond the body to prevent frictional contact of the roller body with the interior wall of the body 16. A pin or shaft 31 is mounted in the body 16 of the device and received in the bushing to rotatably support the roller. The latter, which is spherical, although this is not essential, projects downwardly below the lower edges 17 and 18 of the main body of the device and may, if desired, project to some extent rearwardly of the inclined rear edge 33 thereof, although this latter feature is not shown. Thus the device 15 with its roller 28 serves as a quiet, wheeled support for the back end portion of the automobile and prevents scraping of the bumper and other parts of the roadway when the automobile traverses abrupt changes in grade.

Normally the device is mounted just below the bumper 12 of the automobile and in order to prevent longitudinal stresses induced in the device through engagement of it with the ground from being imparted to the exhaust system, I provide a pair of spaced projections or ridges 35 on the upper surface of the body between which the lower portion 12' of the automobile bumper is received and seated when the device strikes the ground. Thus longitudinal movement of the device is prevented by its engagement with the bumper. It will be noted that the bumper seats directly over the roller so that the weight thereby imposed on the device is not borne by the tailpipe of the automobile. Also, inasmuch as the majority of modern automobiles are fitted with dual exhaust systems, the bumper will be supported at two spaced points by two of the devices of the invention.

While I have shown and described a preferred form of my invention, I contemplate that various changes and modifications can be made without departing from the scope of the invention. As previously indicated, the device might be attached to the tailpipe by setscrews or a clamp. Also, the device need not have a slot or opening from end to end and thus the tailpipe receiving end might be cylindrical. It will also be apparent that the device may be mounted at the back ends of trailers by being welded in place to the bumper or frame, and thus serve as a wheeled support in cases where the back end might otherwise strike the roadway.

I claim:

1. An exhaust pipe extension, comprising a generally tubular body having an inner end and an outer end and characterized by a relatively wide opening extending from the outer end of the body longitudinally thereof for a substantial distance, said body being adapted to receive and be attached at its inner end to the end portion of an automobile exhaust tailpipe with said opening facing downwardly, and a roller mounted in said body near the outer end thereof for rotation on an axis extending transversely of the body, said roller projecting through the opening in the body and therebelow.

2. The exhaust pipe extension set forth in claim 1 in which said opening in said body extends from end to end of the body.

3. An exhaust pipe extension, comprising a semitubular body in the shape of a tube interrupted by a wide opening extending longitudinally from end to end thereof, a deflector wall in said body between the ends thereof, said body being adapted at one end to receive and be attached to the end of an automobile tailpipe with said opening facing downwardly whereby exhaust gases issuing from the tailpipe strike said deflector wall and are deflected downwardly through said opening in the body, and a roller mounted in said body for rotation on an axis extending transversely of the body at a region between said deflector wall and the other end of the body, said roller projecting through the opening in the body and therebelow.

4. The device set forth in claim 5 in which said deflector wall is so inclined that its lower edge is the closest portion thereof to said other end of the body, said body having a rear edge inclined oppositely to said deflector wall.

References Cited by the Examiner

UNITED STATES PATENTS

| 2,123,858 | 7/1938 | Wightman | 239—288.3 |
| 2,355,674 | 8/1944 | Peters et al. | 239—288.5 |
| 2,515,391 | 7/1950 | Arbib | 239—289 X |
| 2,695,630 | 11/1954 | Klein et al. | 239—289 |
| 2,864,406 | 12/1958 | Schewel | 239—521 X |

FOREIGN PATENTS

| 28,613 | 1903 | Great Britain. |
| 641,585 | 8/1950 | Great Britain. |

M. HENSON WOOD, Jr., *Primary Examiner.*

V. C. WILKS, *Assistant Examiner.*